United States Patent
Zheng et al.

(10) Patent No.: US 8,789,833 B2
(45) Date of Patent: Jul. 29, 2014

(54) TURBINE ASSEMBLY AND METHOD FOR ASSEMBLING A TURBINE

(75) Inventors: Xiaoqing Zheng, Niskayuna, NY (US); Mehmet Demiroglu, Troy, NY (US); Guoqiang Lu, Watervliet, NY (US); Michael Dennis Mack, Ballston, NY (US); Binayak Roy, Mountain View, CA (US)

(73) Assignee: General Electric Company, Schenectady, NY (US)

( * ) Notice: Subject to any disclaimer, the term of this patent is extended or adjusted under 35 U.S.C. 154(b) by 335 days.

(21) Appl. No.: 13/432,259

(22) Filed: Mar. 28, 2012

(65) Prior Publication Data
US 2013/0256990 A1    Oct. 3, 2013

(51) Int. Cl.
*F16J 15/02*    (2006.01)

(52) U.S. Cl.
CPC .............. *F16J 15/022* (2013.01); *F16J 15/027* (2013.01)
USPC ........................................ 277/644; 415/174.2

(58) Field of Classification Search
CPC ......... F16J 15/02; F16J 15/022; F16J 15/027; F01D 11/005
USPC .......................... 277/644, 645, 647, 530, 567; 415/134–135, 214.1, 174.2, 173.3
See application file for complete search history.

(56) References Cited

U.S. PATENT DOCUMENTS

| | | | | |
|---|---|---|---|---|
| 6,648,333 | B2 * | 11/2003 | Aksit et al. | 277/316 |
| 6,659,472 | B2 * | 12/2003 | Aksit et al. | 277/647 |
| 6,752,592 | B2 * | 6/2004 | Mohammed-Fakir et al. | 415/139 |
| 7,946,808 | B2 | 5/2011 | Taylor et al. | |
| 8,210,799 | B1 | 7/2012 | Rawlings | |
| 2006/0002787 | A1 | 1/2006 | Carlson | |
| 2007/0009350 | A1 * | 1/2007 | Tothill | 415/170.1 |
| 2011/0304103 | A1 * | 12/2011 | Swensen et al. | 277/630 |

OTHER PUBLICATIONS

Combined Search and Examination Report from GB Application No. 1305258.4 dated Sep. 23, 2013.

* cited by examiner

*Primary Examiner* — Vishal Patel
(74) *Attorney, Agent, or Firm* — Cantor Colburn LLP

(57) ABSTRACT

According to one aspect of the invention, a turbine assembly includes a first stationary component, a second stationary component positioned radially outside the first stationary component, a first key feature on the first stationary component configured to mate to a second key feature on the second stationary component and a seal assembly positioned between the first and second key features to reduce fluid flow between the first and second key features. The seal assembly includes a V-shape member and a second member adjacent to the V-shape member, the second member and V-shape member having different rates of thermal expansion. The seal assembly also includes a latch feature coupled to the V-shape member configured to expand the seal assembly from a compressed state to an expanded sealing state when the seal assembly is subject to an elevated temperature.

17 Claims, 5 Drawing Sheets

TURBINE ASSEMBLY AND METHOD FOR ASSEMBLING A TURBINE

BACKGROUND OF THE INVENTION

The subject matter disclosed herein relates to stationary and rotating machinery. More particularly, the subject matter relates to an apparatus for a seal assembly for a stationary component of a mechanical system, such as a turbine system, engine system or pump system.

For example, in a turbine system, such as a steam turbine system, fluid flow is directed to selected portions of the system to enable production of mechanical energy. Seals may be positioned between selected turbine components to reduce fluid flow or leakage into regions of the turbine where the fluid cannot be converted to mechanical energy, thereby increasing turbine efficiency. In some cases, during turbine operation stationary turbine components can experience thermal expansion and may move relative to each other. Relative movement of components can cause stress and wear for seals. For example, radial seals (e.g., seals that extend radially between parts to block axial fluid flow) placed between components may be subjected to hoop stress due to thermal expansion.

BRIEF DESCRIPTION OF THE INVENTION

According to one aspect of the invention, a turbine assembly includes a first stationary component, a second stationary component positioned radially outside the first stationary component, a first key feature on the first stationary component configured to mate to a second key feature on the second stationary component and a seal assembly positioned between the first and second key features to reduce fluid flow between the first and second key features. The seal assembly includes a V-shape member and a second member adjacent to the V-shape member, the second member and V-shape member having different rates of thermal expansion. The seal assembly also includes a latch feature coupled to the V-shape member configured to expand the seal assembly from a compressed state to an expanded sealing state when the seal assembly is subject to an elevated temperature, wherein the expanded sealing state causes the seal assembly to contact substantially parallel radial surfaces on the first and second key features.

According to another aspect of the invention, a method for assembling a turbine includes coupling a first member to a second member to form a seal assembly, the first member and second member having different rates of thermal expansion, positioning the seal assembly in an axial recess in an outer stationary component and positioning an inner stationary component radially inside the outer stationary component, where a first key feature on the inner stationary component is received by a second key feature in the outer stationary component, the axial recess being located in the second key feature, the seal assembly positioned between the first and second key features to reduce fluid flow in a substantially radial direction between the first and second key features.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
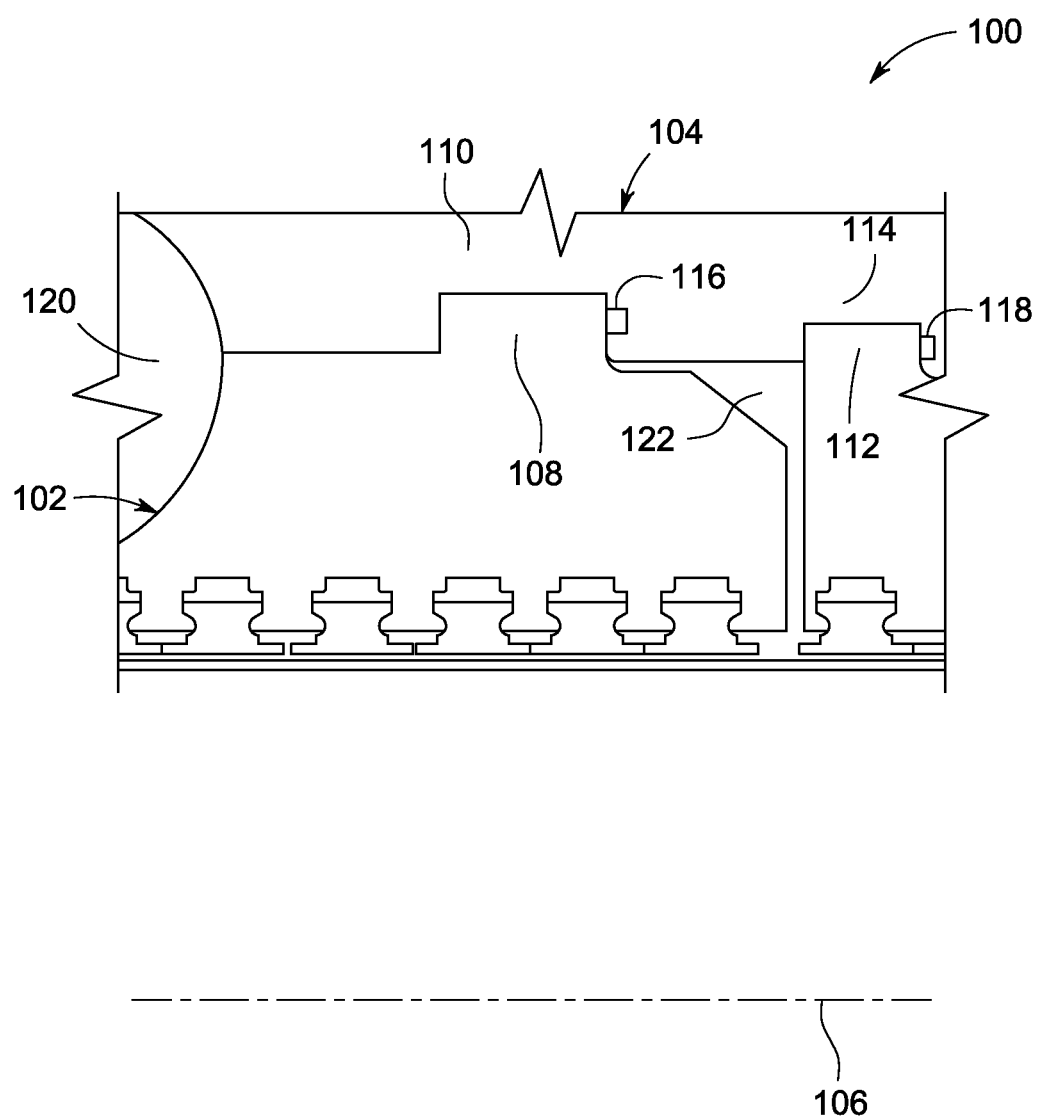
FIG. 1 is a side view of a portion of a turbine assembly according to an embodiment.

FIG. 1 is a side view of a portion of a turbine assembly 100 according to an embodiment. The turbine assembly 100 includes a packing head 102 positioned within a shell 104 with respect to a turbine axis 106. The packing head 102 includes a key feature 108 that mates to or is received by a key feature 110 of the shell 104 during assembly of the turbine. Similarly, a key feature 112 is received by a key feature 114 during turbine assembly as well. As discussed in further detail below, axial recesses 116 and 118 in the key features are configured to receive axial seals to reduce or prevent radial fluid flow between the key features. Axial seals reduce fluid flow caused by pressure differences between selected regions of the turbine assembly. Specifically, an axial seal placed in axial recess 116 reduces fluid flow from a high pressure region 120 to a relatively lower pressure region 122, thereby improving turbine efficiency. The seal assemblies may be placed between any suitable stationary components to reduce fluid flow, such as but not limited to, packing heads, inner shells and outer shells of the turbine system As used herein, "downstream" and "upstream" are terms that indicate a direction relative to the flow of working fluid through the turbine. As such, the term "downstream" refers to a direction that generally corresponds to the direction of the flow of working fluid, and the term "upstream" generally refers to the direction that is opposite of the direction of flow of working fluid. The term "radial" refers to movement or position perpendicular to an axis or center line. It may be useful to describe parts that are at differing radial positions with regard to an axis. In this case, if a first component resides closer to the axis than a second component, it may be stated herein that the first component is "radially inward" of the second component. If, on the other hand, the first component resides further from the axis than the second component, it can be stated herein that the first component is "radially outward" or "outboard" of the second component. The term "axial" refers to movement or position parallel to an axis. Finally, the term "circumferential" refers to movement or position around an axis. Although the following discussion primarily focuses on steam turbines, the concepts discussed are not limited to steam turbines and may apply to any suitable machinery, including gas turbines, steam turbines, pumps, gasoline engines or turbine engines. Accordingly, the discussion herein is directed to steam turbine embodiments, but may apply to other stationary or rotating machinery.

Figure 3:
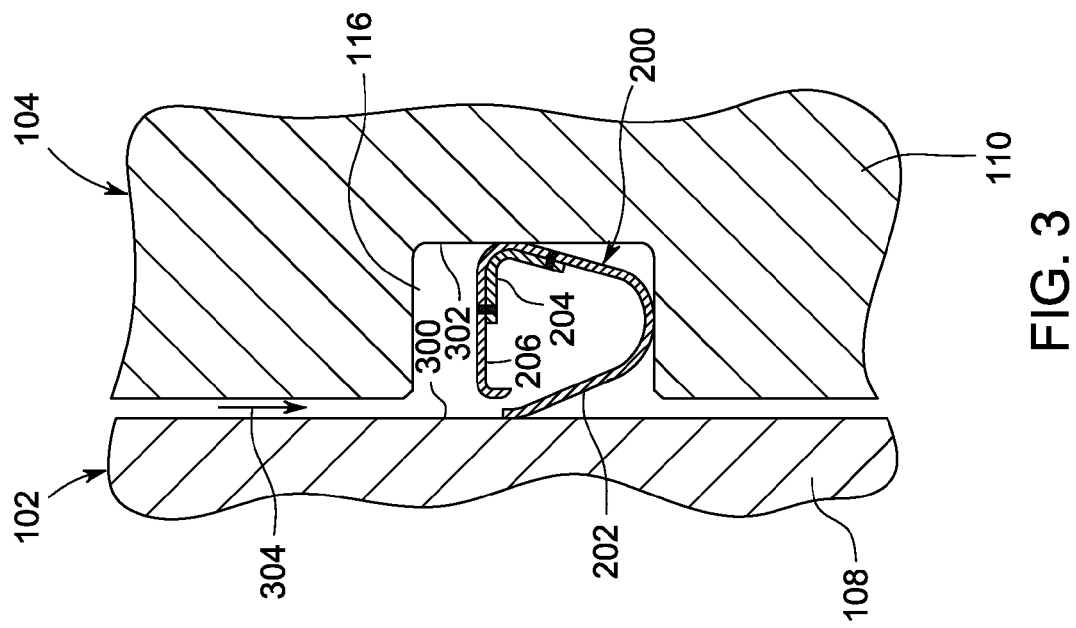
FIG. 3 is a schematic side sectional view of the portion of the turbine assembly shown in FIG. 2 including a seal assembly in an expanded sealing state.
Figure 2:
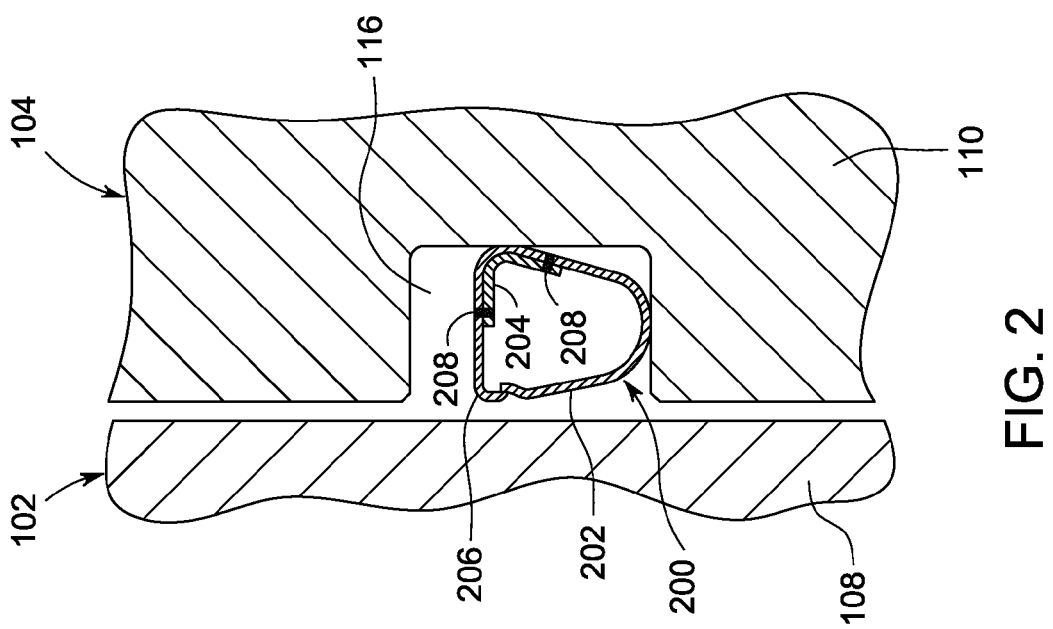
FIG. 2 is a detailed sectional view of a portion of the turbine assembly shown in FIG. 1 including a seal assembly in a compressed state.

FIG. 2 is a detailed sectional side view of a portion of the turbine assembly 100 shown in FIG. 1 including a seal assembly 200 positioned in the axial recess 116. FIG. 2 illustrates the seal assembly 200 in a compressed state. FIG. 3 is a sectional side view of the seal assembly 200 in an expanded sealing state. The exemplary seal assembly 200 includes an outer member 202 adjacent to and coupled to an inner member 204. In an embodiment the inner member 204 has a higher rate of thermal expansion (e.g., coefficient of thermal expansion) than the outer member 202 thus creating expansion forces when the assembly is exposed to elevated temperatures. As depicted, the outer member 202 has a V-shape cross section with a lid and latching feature 206 extending from the outer member 202. In embodiments, the inner and outer members 202, 204 may be any suitable shape (where the members are nested as shown), such as V, U, W or Ω shape, where thermal expansion of the inner member 204 and outer member 202 causes the seal assembly 200 to expand when subjected to selected elevated temperatures, such as a turbine operating temperature. For example, the selected temperatures may be elevated temperatures ranging from about 150-3000 degrees Fahrenheit (F). In one example, the selected temperature is at or below room temperature (e.g., 72 degrees F.). In another example, the selected elevated temperature is about 150-500 degrees F. In yet another example, the selected temperature is about 250-1000 degrees F. In another example, the selected temperature is about 250-750 degrees F. In another example, the selected temperature is about 500-1500 degrees F. The inner member 204 is coupled to the outer member 202 via a coupling 208, such as a fastener, weld or braze.

In an embodiment, the seal assembly 200 is compressed in a substantially axial direction (with respect to axis 106) and latched in the compressed state prior to positioning the seal assembly 200 in the axial recess 116 of the key feature 110. The key feature 108 is then positioned within the key feature 110 during assembly, where the compressed state of the seal assembly 200 prevents the seal assembly 200 from interfering during insertion of the key feature 108. In embodiments, the stationary components of the turbine system, such as the packing head 102 and shell 104, each comprise two or more parts to simplify production and assembly. For example, the packing head 102 and shell 104 may each comprise two half parts disposed about the axis 106, where the upper portions of one "half part" are shown in FIG. 1. In the example, the seal assembly 200 is a circular or ring shape seal disposed in the circular axial recess 116. In one embodiment, the seal assembly 200 comprises one or more portions that make up the entire ring shape disposed in the axial recess 116. For example, two half ring shape portions (e.g., semi-circle portions) may each be installed in respective half parts of the stationary components during assembly of the turbine assembly 100. As shown in further detail in the embodiment shown in FIG. 4, the seal assembly 200 may include a plurality of latch features 206 spaced circumferentially about the seal assembly 200. Further, the seal assembly 200 may include a plurality of inner members 204 spaced circumferentially about the seal assembly 100 and proximate the latch features 206 to provide thermal expansion characteristics to open the latch features 206 when subjected to the turbine operating temperature. The inner members 204 are positioned proximate latch features 206 to provide expansion force when exposed to elevated temperatures, causing the latch features 206 open and the assembly to expand. In embodiments, a single continuous inner member 204 is positioned within the outer member 202.

Referring back to FIG. 3, the depicted embodiment shows the seal assembly 200 in an expanded sealing state. The expanded sealing state of the seal assembly 200 causes the assembly to expand in a substantially axial direction and contact a wall or radial surface 300 of the key feature 108 and a radial surface 302 of the key feature 110, thereby reducing or preventing a fluid flow 304 in a substantially radial direction. The radial surfaces 300 and 302 are substantially parallel and axially spaced walls bounding the axial recess 116. In an embodiment, the seal assembly 200 expands to the expanded sealing state where the latch feature 206 is opened by the thermal expansion of the outer member 202 and inner member 204, where the seal assembly 200 remains in the expanded sealing state (i.e., contacting radial surfaces 300, 302) when the surrounding temperature is reduced below the turbine operating temperature. Further, the embodiment of seal assembly 200 is an axial seal that experienced reduced hoop stress and wear as the packing head 102 and shell 104 experience thermal expansion and move relative to one another.

Figure 5:
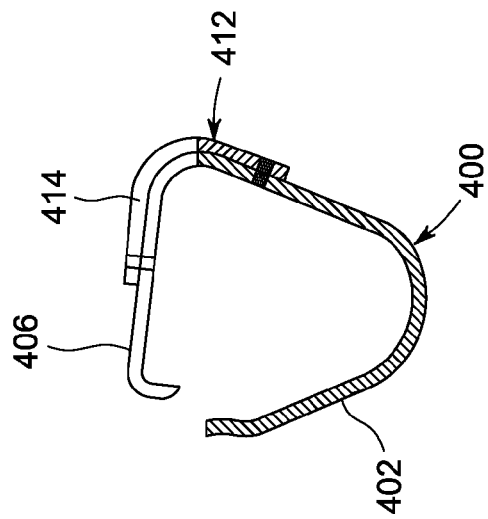
FIGS. 4 and 5 are an end view and a sectional side view, respectively of a seal assembly according to an embodiment.
Figure 4:
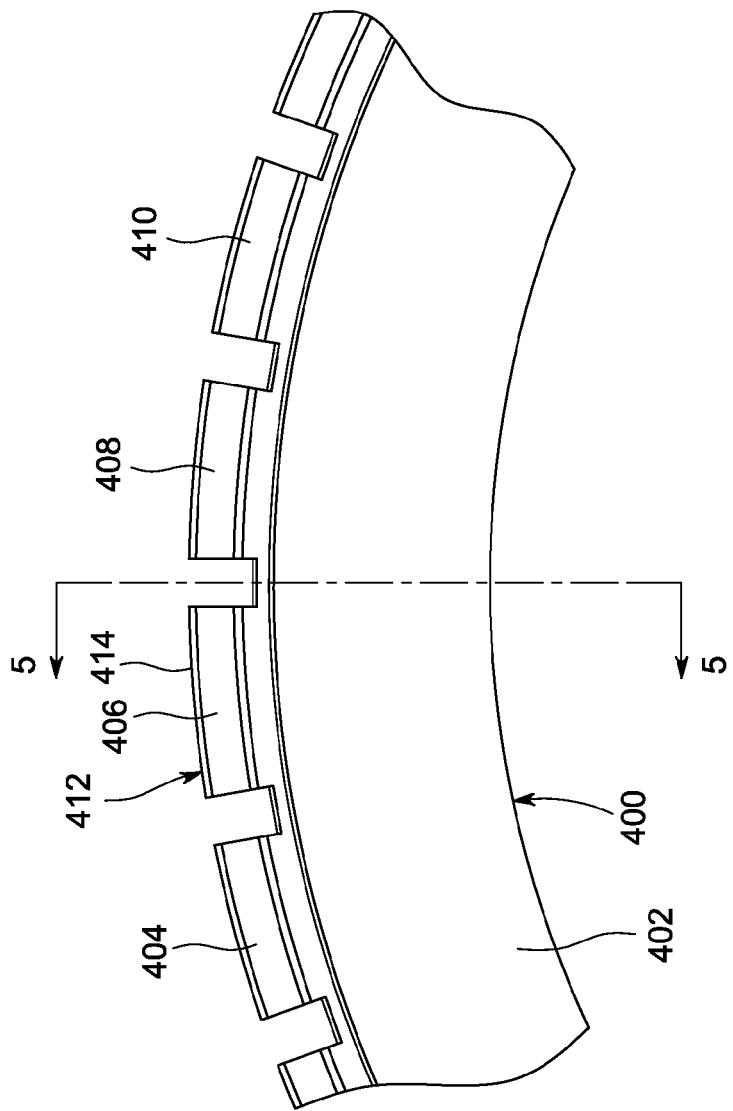

FIGS. 4 and 5 are an end view and a sectional side view, respectively, of an embodiment of a seal assembly 400. The seal assembly 400 includes a first member 402 within and coupled to a second member 412. In an embodiment, the first member 402 has a higher rate of thermal expansion than the second member 404. As depicted in FIG. 4, a plurality of latch features 404, 406, 408 and 410 are circumferentially disposed about the ring shape seal assembly 400. In one embodiment, the second member 412 may include one or more continuous members forming a ring shape, where the members have a plurality of protrusions 414 extending onto and coupled to the plurality of latch features 404, 406, 408 and 410. In another embodiment, the assembly includes a single continuous latch feature with a single continuous second member about the circumference of the seal assembly.

Figure 6:
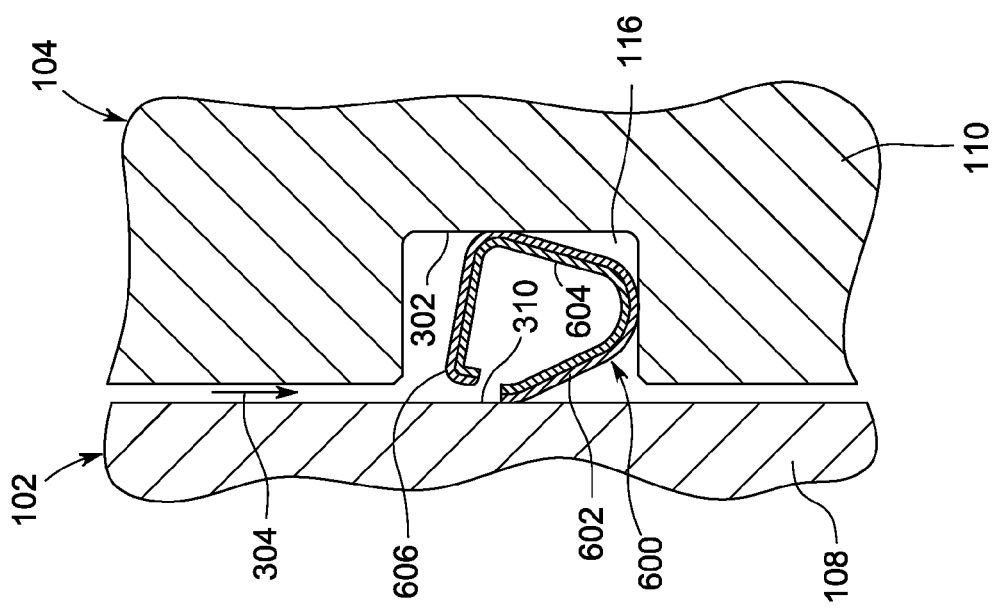
FIG. 6 is a detailed sectional view of a portion of a turbine assembly including a seal assembly according to another embodiment.

FIG. 6 is side sectional view of another embodiment of a seal assembly 600 to be positioned within the axial recess 116. The seal assembly 600 includes an outer member 602 and inner member 604, where each member has a substantially V shape cross section. Further, the seal assembly 600 has a lid and latch feature 606 configured to release the seal assembly 600 to the depicted expanded sealing state when the seal assembly 600 is exposed to turbine operating temperatures. In an embodiment, the outer member 602 and inner member 604 are substantially uniform and continuous for the entire ring shape of the seal assembly 600. In addition, the inner member 604 has a higher rate of thermal expansion than the outer member 602, thereby causing the desired expanding characteristic.

Figure 7:
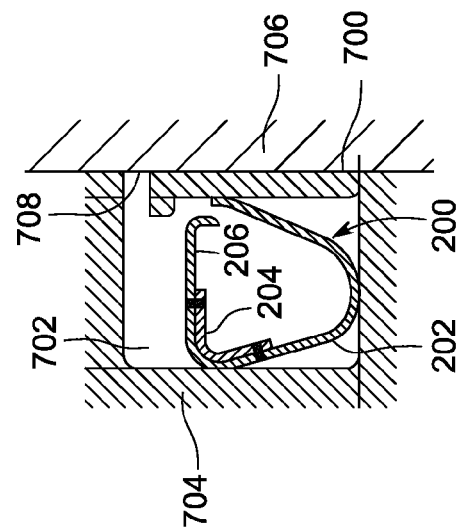
FIG. 7 is a detailed sectional view of a portion of a turbine assembly including a seal assembly and an intermediate member according to another embodiment.

FIG. 7 is a side sectional view of an embodiment of the seal assembly 200 and an intermediate member 700 located in an axial recess 702. The axial recess 702 is a cavity formed in a key feature 704 of a first stationary component adjacent to a key feature 706 of a second stationary component. The intermediate member 700 provides an intermediate contact surface for the seal assembly 200 in the expanded sealing state. The seal assembly 200 contacts the intermediate member 700 instead of a surface 708, where the surface 708 may move relative to the seal assembly 200 during thermal expansion while the intermediate member 700 does not move, thus reducing rubbing and wear for the seal assembly 200. Accordingly, the intermediate member 700 maintains contact with the surface 708 during thermal expansion while also preventing radial flow while the seal assembly 200 is in an expanded sealing state. The seal assemblies described in FIGS. 1-7 may be made of durable alloys, such as stainless steels with varying rates of thermal expansion.

Figure 8:
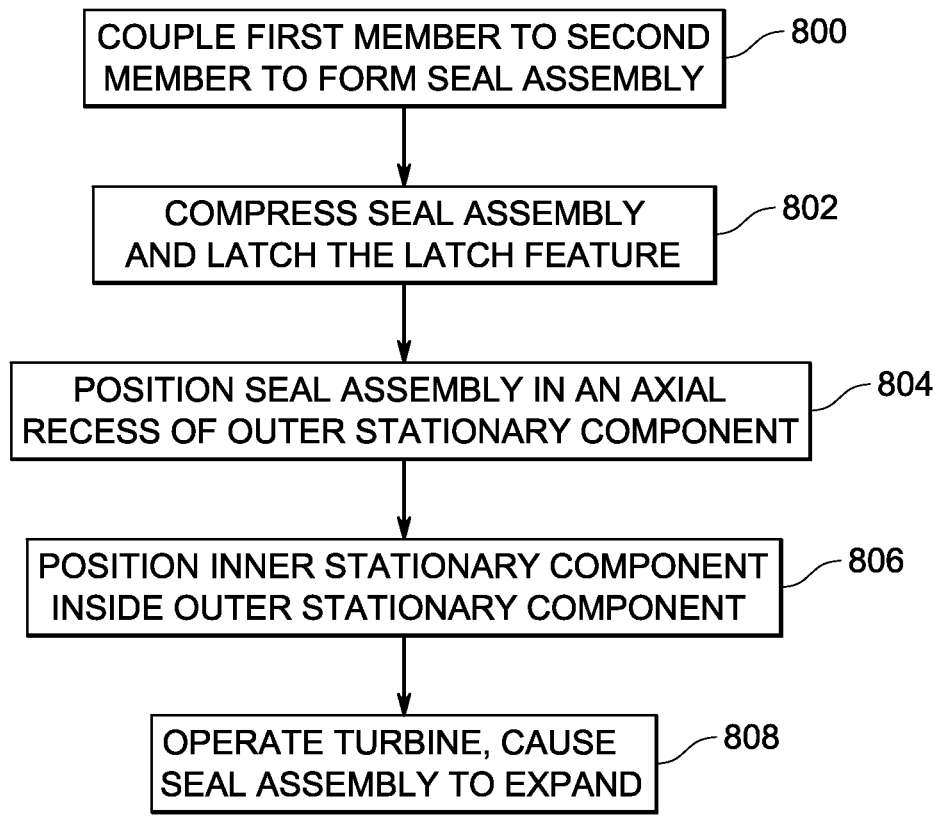
FIG. 8 is a chart of a process for assembling a turbine that includes a seal assembly according to an embodiment.

FIG. 8 is an exemplary chart of a process for assembling a turbine that includes a seal assembly. In block 800, a first member is coupled to a second member to form a seal assembly, where the first member and second member having different rates of thermal expansion. In block 802, the seal assembly is compressed and a latch feature of the seal assembly is latched to retain the seal assembly in a compressed state as the seal assembly is positioned in an axial recess. In block 804, the seal assembly is positioned in an axial recess in an outer stationary component. In block 806, an inner stationary component is positioned radially inside the outer stationary component, where a first key feature on the inner stationary component is received by a second key feature in the outer stationary component. In an embodiment, the axial recess is located in the second key feature, where the seal assembly is positioned between the first and second key features to reduce fluid flow in a substantially radial direction between the first and second key features. In block 808, the turbine system is operated, where the seal assembly expands to an expanded sealing state when the seal assembly is subjected to a turbine operating temperature. The expanded sealing state causes the seal assembly to contact substantially parallel radial surfaces on the first and second key features, providing the blocking of the radial fluid flow during turbine operation.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A turbine assembly comprising:
a first stationary component;
a second stationary component positioned radially outside the first stationary component;
a first key feature on the first stationary component configured to mate to a second key feature on the second stationary component; and
a seal assembly positioned between the first and second key features to reduce fluid flow between the first and second key features, the seal assembly comprising:
a V-shape member;
a second member within the V-shape member, the second member and V-shape member having different rates of thermal expansion; and
a latch feature integrally formed with the V-shaped member configured to expand the seal assembly from a compressed state to an expanded sealing state when the seal assembly is subject to an elevated temperature, wherein the expanded sealing state causes the seal assembly to contact substantially parallel radial surfaces on the first and second key features.

2. The turbine assembly of claim 1, wherein the second key feature includes an axial recess bound by the substantially parallel radial surfaces, the axial recess configured to receive the seal assembly, wherein the seal assembly comprises a ring shape.

3. The turbine assembly of claim 2, wherein the axial recess is configured to receive the seal assembly when the seal assembly is in the compressed state to enable the second key feature to receive the first key feature during assembly.

4. The turbine assembly of claim 2, wherein the expanded sealing state of the seal assembly reduces fluid flow in a radial direction between the first and second key features.

5. The turbine assembly of claim 2, wherein the seal assembly remains in the expanded sealing state after a temperature of the turbine assembly is decreased from the elevated temperature.

6. The turbine assembly of claim 1, wherein the latch feature is positioned proximate the second member.

7. The turbine assembly of claim 6, wherein the seal assembly comprises a ring shape and wherein a plurality of latch features are positioned along a circumference of the seal assembly.

8. The turbine assembly of claim 6, wherein the second member is positioned within the V-shape member and has a higher rate of thermal expansion than the V-shape member.

9. The turbine assembly of claim 1, wherein the first stationary component comprises a packing head and the second stationary component comprises a shell.

10. The turbine assembly of claim 1, comprising an intermediate member positioned between the first key feature and the seal assembly, the intermediate member configured to prevent the seal assembly from rubbing a radial surface of the first key feature during relative movement between the first and second stationary components.

11. A method for assembling a turbine, the method comprising:
coupling a first member having a V-shape to a second member arranged within the first member to form a seal assembly, the first member and second member having different rates of thermal expansion;
positioning the seal assembly in an axial recess in an outer stationary component; and
positioning an inner stationary component radially inside the outer stationary component, where a first key feature on the inner stationary component is received by a second key feature in the outer stationary component, the axial recess being located in the second key feature, the seal assembly positioned between the first and second key features to reduce fluid flow in a substantially radial direction between the first and second key features; and
compressing the seal assembly and latching a latch feature integrally formed with the first member to retain the seal assembly in a compressed state as the seal assembly is positioned in the axial recess, wherein the seal assembly expands from the compressed state to an expanded sealing state when the seal assembly is subjected to an elevated temperature, wherein the expanded sealing state causes the seal assembly to contact substantially parallel radial surfaces on the first and second key features.

12. A turbine assembly comprising:
a first stationary component;
a second stationary component positioned radially outside the first stationary component;
a first key feature on the first stationary component configured to mate to a second key feature on the second stationary component; and
a seal assembly positioned between the first and second key features to reduce fluid flow between the first and second key features, the seal assembly comprising:
a first member having a V-shape;

a second member within the first member, the second member having a higher rate of thermal expansion than the first member; and a latch feature coupled to and end of the first member and contacting a second end of the first member, the latch feature configured to expand the seal assembly from a compressed state to an expanded sealing state when the seal assembly is subject to an elevated temperature, wherein the expanded sealing state causes the seal assembly to contact substantially parallel radial surfaces on the first and second key features and to reduce flow in a radial direction.

13. The turbine assembly of claim 12, wherein the second key feature includes an axial recess bound by the substantially parallel radial surfaces, the axial recess configured to receive the seal assembly, wherein the seal assembly comprises a ring shape.

14. The turbine assembly of claim 13, wherein the axial recess is configured to receive the seal assembly when the seal assembly is in the compressed state to enable the second key feature to receive the first key feature during assembly.

15. The turbine assembly of claim 13, wherein the expanded sealing state of the seal assembly reduces fluid flow in the radial direction between the first and second key features.

16. The turbine assembly of claim 13, wherein the seal assembly remains in the expanded sealing state after a temperature of the turbine assembly is decreased from the elevated temperature.

17. The turbine assembly of claim 12, wherein the latch feature is positioned proximate the second member.

* * * * *